(12) United States Patent
Tang et al.

(10) Patent No.: US 8,037,210 B2
(45) Date of Patent: Oct. 11, 2011

(54) COMPUTER AND METHOD FOR DIRECTLY ACCESSING COMPUTER HARDWARE BY VIRTUAL SYSTEM

(75) Inventors: Liang Tang, Beijing (CN); Chunyu Song, Beijing (CN); Ke Ke, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 62 days.

(21) Appl. No.: 12/623,076

(22) Filed: Nov. 20, 2009

(65) Prior Publication Data

US 2010/0125679 A1 May 20, 2010

(30) Foreign Application Priority Data

Nov. 20, 2008 (CN) .......................... 2008 1 0226934

(51) Int. Cl.
*G06F 3/00* (2006.01)
*G06F 9/455* (2006.01)

(52) U.S. Cl. .................. 710/8; 710/10; 718/1
(58) Field of Classification Search ............... 710/8, 10; 718/1
See application file for complete search history.

(56) References Cited

U.S. PATENT DOCUMENTS 7,865,893 B1 * 1/2011 Omelyanchuk et al. .......... 718/1
2006/0005187 A1 * 1/2006 Neil .................................. 718/1
2008/0005297 A1 * 1/2008 Kjos et al. ..................... 709/223
2009/0013149 A1 * 1/2009 Uhlig et al. ................... 711/207
2009/0300613 A1 * 12/2009 Doi ................................ 718/1

* cited by examiner

*Primary Examiner* — Alford Kindred
*Assistant Examiner* — David Martinez
(74) *Attorney, Agent, or Firm* — Kinney & Lange, P.A.

(57) ABSTRACT

A computer and method for directly accessing computer hardware by a virtual system are provided. The computer comprises a hardware platform having a first-type device, a second-type device and a third-type device provided thereon; a virtual machine managing module; a first operating module; a second operating module; wherein the virtual machine managing module comprises a first-type device configuration module for directly configuring the first type device to be used by the main operating system; a second-type device configuration module for directly configuring the second-type device to be used by the guest operating system; and a third-type device configuration module for virtualizing the third-type device on the hardware platform to generate a virtualized third-type device and configuring the virtualized third-type device to be used by the main operating system and the guest operating system, respectively. The present invention considers the distribution and use of the devices as a whole in combination with the use of BIOS in the main board. Therefore, the incompatibility problem between hardware and software of the virtual system can be solved.

11 Claims, 4 Drawing Sheets

COMPUTER AND METHOD FOR DIRECTLY ACCESSING COMPUTER HARDWARE BY VIRTUAL SYSTEM

FIELD OF THE INVENTION

The present invention relates to the field of computer, and particularly to a computer based on virtualization technology and a method for directly accessing computer hardware by a virtual system.

BACKGROUND OF THE INVENTION

Regarding virtual machine technology in the computer field, as shown in FIG. 1, a virtual machine system typically comprises a virtual machine manager (e.g., Hypervisor in Xen) installed on a computer hardware platform and a plurality of operating systems (OSs), one of which being Domain 0, i.e., the Host OS, and the remaining ones being Guest OSs. In a virtual machine environment, hardware devices on the hardware platform can be directly used by Domain 0. For a Guest OS, however, hardware devices used are typically those virtualized for it by the virtual machine manager, which degrades the performance of the Guest OS. In order to enhance the access capability to the hardware devices by a Guest OS, improvements can be made with respect to direct hardware access (DHA) by the Guest OS. However, according to the existing designs for DHA by the Guest OS, only DHA of a certain PCI device is taken into consideration without designing the direct access of software and hardware as a whole. Under such circumstance, there tends to be incompatibility problem for devices in the hardware platform. Further, according to the existing architecture, in designing DHA of a certain hardware PCI device in a hardware platform, consideration is given only to provide a hardware PCI device to a certain Guest OS in a DHA mode. Thus, if it is desired to provide more hardware in the hardware platform to a certain operating system in a DHA mode, separate design for each of the hardware devices is required, and higher requirements are imposed on the operating system of Domain 0. This may cause a lot of trouble in programming and developing.

During implementing the present invention, at least the following problems are found by the inventors.

In terms of hardware, a hardware device can be provided to a particular virtual operating system in a DHA mode. However, there is no corresponding support in terms of software. That is, BIOS remains virtual for the particular virtual operating system, which leads to incompatibility between the hardware device and a plurality of operating systems. On the other hand, it is impossible to provide a plurality of hardware on a hardware platform as a whole only to a particular operating system in a DHA mode.

SUMMARY OF THE INVENTION

An object of the present invention is to provide a computer and a method for directly accessing computer hardware by a virtual system, which enables consideration of distribution and use of hardware devices as a whole to solve incompatibility problem with the virtual system of hardware and software.

To achieve the above object, the following solutions are provided with embodiments of the present invention.

In an aspect, a computer is provided, which comprises:
a hardware platform having a first-type device, a second-type device and a third-type device provided thereon;
a virtual machine managing module installed with a virtual machine manager;
a first operating module installed with a host operating system; and
a second operating module installed with a guest operating system, the guest operating system being installed on the virtual machine manager;
wherein the virtual machine managing module comprises:
a first-type device configuration module for directly configuring the first-type device to be used by the main operating system, the first-type device being a device dedicated to be used by the main operating system;
a second-type device configuration module for directly configuring the second-type device to be used by the guest operating system, the second-type device being a device dedicated to be used by the guest operating system; and
a third-type device configuration module for virtualizing the third-type device in the hardware platform to generate a virtualized third-type device and configuring the virtualized third-type device to be used by the host operating system and the guest operating system, respectively.

Preferably, the first-type device comprises a PCI device and a BIOS used by the host operating system.

Preferably, the second-type device comprises a PCI device, a first-type clock, an advanced configuration and power interface and a BIOS used by the guest operating system.

Preferably, the third-type device comprises a second-type clock, an interrupt controller and a port mode register.

Preferably, the first-type clock comprises a real-time clock and an advanced configuration and power interface timer clock.

Preferably, the second-type clock comprises a programmable interval timer clock and a high precision event timer.

Preferably, the interrupt controller comprises an interrupt controller and an advanced programmable interrupt controller.

Preferably, the PCI device comprises a network card.

Preferably, the second-type device configuration module comprises:
a PCI configuration module for configuring a PCI configuration space for the PCI device, the PCI configuration space comprising at least a header area for identifying the PCI device and a device specific area for storing information on the PCI device;
an I/O configuration module for configuring I/O port for the PCI device and the advanced configuration and power interface;
a memory configuration module for configuring memory resource for the PCI device and the advanced configuration and power interface; and
an interrupt configuration module for establishing, for the PCI device, mapping between the interrupt numbers for the interrupt controller mode and the advanced programmable interrupt controller mode.

Preferably, the BIOS used by the guest operating system comprises:
a first processing module for modifying the memory address and memory size of the advanced configuration and power interface in a memory distribution table to generate a new memory distribution table, and providing actual memory resource to the guest operating system based on the new memory distribution table;
a second processing module for modifying a symmetrical multiprocessing system table to generate a new symmetrical multiprocessing system table, and providing a virtualized advanced programmable interrupt controller to the guest operating system based on the new symmetrical multiprocessing system table; and a third processing module for modifying a MADT table corresponding to a virtualized advanced configuration and power interface to generate a new MADT table, and providing the actual advanced configuration and power interface to the guest operating system based on the new MADT table.

Preferably, the third type device configuration module comprises:

an I/O configuration module for configuring I/O port for the virtualized second-type clock and the virtualized interrupt controller; and a memory configuration module for configuring virtual memory for the virtualized second-type clock and the virtualized interrupt controller.

Preferably, the virtualized interrupt controller comprises:

a virtualized interrupt controller for I/O port and/or a virtualized interrupt controller for CPU.

Preferably, the first type device configuration module comprises:

a PCI configuration module for configuring a PCI configuration space for the PCI device, the PCI configuration space comprising at least a header area for identifying the PCI device and a device specific area for storing information on the PCI device;

an I/O configuration module for configuring I/O port for the PCI device; and a memory configuration module for configuring memory resource for the PCI device.

In another aspect, a method for directly accessing computer hardware by a virtual system is provided, which comprises the following steps of:

configuring directly a first-type device in a computer hardware platform to be used by a host operating system of the computer;

configuring directly a second-type device in the computer hardware platform to be used by a guest operating system of the computer; and virtualizing a third-type device in the computer hardware platform to generate a virtualized third-type device and configuring the virtualized third-type device to be used by the host operating system and the guest operating system, respectively.

Preferably, the step of configuring directly the second-type device in the computer hardware platform to be used by the guest operating system of the computer comprises:

configuring a PCI configuration space for a PCI device included in the second type device, the PCI configuration space comprising at least a header area for identifying the PCI device and a device specific area for storing information on the PCI device;

configuring I/O port for the PCI device and a advanced configuration and power interface included in the second type device;

configuring memory resource for the PCI device and the advanced configuration and power interface included in the second type device; and establishing, for the PCI device included in the second-type device, mapping between the interrupt numbers for an interrupt controller mode and an advanced programmable interrupt controller mode.

Preferably, the method further comprises:

modifying the memory address and memory size of the advanced configuration and power interface in a memory distribution table in a BIOS of the computer to generate a new memory distribution table, and providing actual memory resource to the guest operating system based on the new memory distribution table;

modifying a symmetrical multiprocessing system table in the BIOS of the computer to generate a new symmetrical multiprocessing system table, and providing a virtualized advanced programmable interrupt controller to the guest operating system based on the new symmetrical multiprocessing system table; and modifying a MADT table in the BIOS of the computer corresponding to a virtualized advanced configuration and power interface to generate a new MADT table, and providing the actual advanced configuration and power interface to the guest operating system based on the new MADT table.

Preferably, the step of configuring the virtualized third-type device to be used by the host operating system and the guest operating system, respectively, comprises:

configuring I/O port for a virtualized second-type clock and a virtualized interrupt controller included in the virtualized third-type device; and configuring virtual memory for the virtualized second-type clock and the virtualized interrupt controller included in the virtualized third-type device.

Preferably, the step of configuring directly the first-type device in the computer hardware platform to be used by the host operating system comprises:

configuring a PCI configuration space for a PCI device included in the first-type device, the PCI configuration space comprising at least a header area for identifying the PCI device and a device specific area for storing information on the PCI device;

configuring I/O port for the PCI device included in the first-type device; and configuring memory resource for the PCI device included in the first-type device.

The embodiments of the present invention have the following advantages. With the above technical solution, the second-type device on the hardware platform can be directly provided to be used by the guest operating system, the third-type device can be virtualized to be used by both of the host and guest operating systems, and the first-type device can be directly provided to be used by the host operating system. The control of the hardware devices by the operating systems can be placed into a virtual machine manager, so as to consider the distribution and use of the devices as a whole. As such, the devices in the hardware platform as a whole can be directly provided, in a DHA mode, only to a particular operating system in combination with the use of BIOS in the main board. Therefore, the incompatibility problem between hardware and software of the virtual system can be solved.

DETAILED DESCRIPTION OF THE PREFERRED EMBODIMENTS

A detailed description of implementations according to the present invention will be given below in conjunction with the drawings, so that the above objects, features and advantages of the present invention become more apparent.

In the prior art, when a hardware device is directly accessed by a virtual operating system, information related to the hardware device in the BIOS of the computer will not be changed accordingly to a state in which the hardware device can be directly used by the virtual operating system. That is, the BIOS is virtual, rather than actual, for the virtual operating system. In such a case, there can be incompatibility among a plurality of operating systems (including a Domain 0 and a plurality of Guest OSs) in the computer when the virtual operating system accesses the hardware device directly. Moreover, when the hardware device is provided to one of the Guest OSs in a DHA mode, Domain 0 can still control and use the hardware device. Thus, if it is desired to provide the hardware device only to the Guest OS in a DHA mode, extra designs for Domain 0 are required, which cause a lot of trouble in programming. The embodiments of the present invention are directed to provide a computer and method for directly accessing hardware thereof by a virtual system, which are capable of placing control of hardware devices by operating systems into a virtual machine manager, considering the distribution and use of devices in general and reducing problems in programming and developing.

Figure 1:
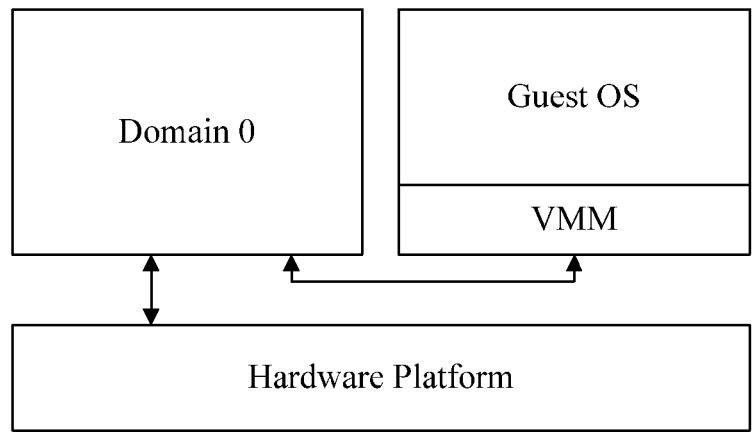
FIG. 1 is a schematic diagram showing the system architecture of an existing virtual machine.
Figure 2:
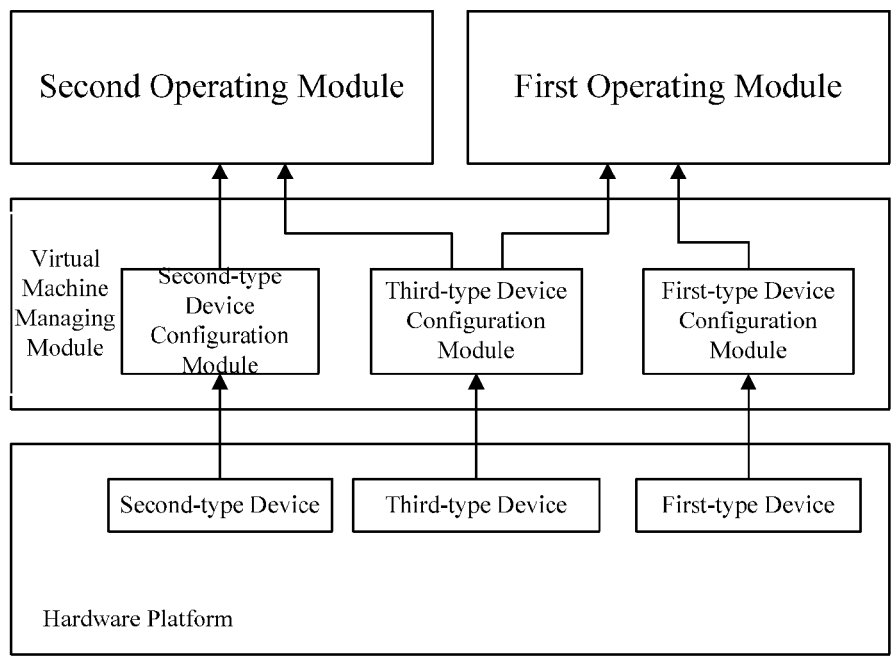
FIG. 2 is a schematic diagram showing the architecture of a computer according to an embodiment of the present invention.

As shown in FIG. 2, the computer according to an embodiment of the present invention comprises:

a hardware platform having a first-type device, a second-type device and a third-type device provided thereon, the hardware platform including actual physical devices of the computer, such as a main board and any hardware device on the main board, e.g., a sound card, a PCI device, a clock, an interrupt controller, a BIOS and a south bridge chip;

a virtual machine managing module equipped with a virtual machine manager (VMM), such as Hypervisor in XEN;

a first operating module installed with a first operating system, such as a host operating system of Domain 0; and a second operating module installed with a second operating system, such as a Guest OS, the second operating system being installed on the virtual machine manager;

wherein the virtual machine managing module comprises:

a first-type device configuration module for directly configuring the first-type device to be used by the main operating system, the first-type device being a device dedicated to be used by the host operating system;

a second-type device configuration module for directly configuring the second-type device to be used by the guest operating system, the second-type device being a device dedicated to be used by the guest operating system; and a third-type device configuration module for virtualizing the third-type device on the hardware platform to generate a virtualized third-type device, and configuring the virtualized third-type device to be used by the host operating system and the guest operating system, respectively.

With this embodiment, the second-type device on the hardware platform can be provided directly to be used by the guest operating system, the third-type device can be virtualized to be used by the host and guest operating systems, and the first-type device can be provided directly to be used by the host operating system. The control of the hardware devices by the operating systems can be placed into a virtual machine manager, so as to consider the distribution and use of the devices as a whole. As such, the devices on the hardware platform can be directly provided, in a DHA mode, only to a particular operating system, thereby reducing problems in developing. Additionally, this is designed in conjunction with use of BIOS in the main board. Therefore, incompatibility problem between hardware and software of the virtual system can be solved.

Figure 3:
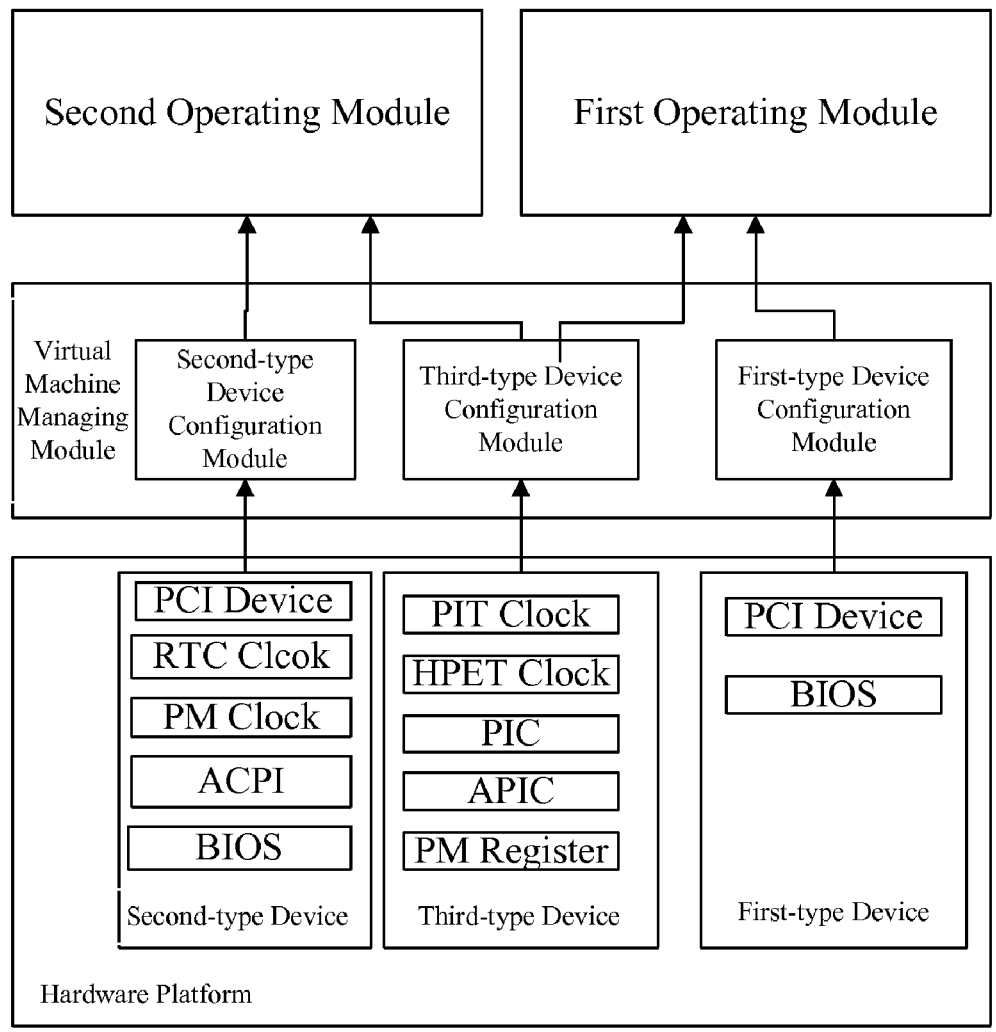
FIG. 3 is a schematic diagram showing the detailed architecture of the computer in FIG. 2.

As shown in FIG. 3, with the basis of the above embodiment shown in FIG. 2, the second-type device as described above can comprise a PCI device, a first-type clock, an advanced configuration and power interface (ACPI) and BIOS. Of course, the second-type device can further comprise other computer devices, such as a conventional computer device. In other words, the second-type device includes all devices except those to be virtualized by the virtual machine manager for the host and guest operating systems and those directly used by the host operating system, e.g., the first type device can also include a flash device. The second-type device performs configuration and management in the virtual machine managing module and can be provided only to the guest operating system in a DHA mode. The first-type clock comprises a real-time clock (RTC clock) and an advanced configuration and power interface timer clock (PM clock).

The third-type device comprises a second-type clock, an interrupt controller and a port mode register. The second-type clock comprises a programmable interval timer clock (PIT clock) and a high precision event timer (HPET clock). The interrupt controller comprises an interrupt controller (PIC) and an advanced programmable interrupt controller (APIC).

The first-type device comprises a PCI device, which can be a network card, and a BIOS used by the host operating system. The first-type device is controlled in the virtual machine managing module and can be provided only to the host operating system in a DHA mode. For example, the network card herein can be set to be disabled for the guest operating system and to be enabled for the host operating system.

For a computer, only one BIOS on the main board actually exists. Thus, the BIOS used by the guest operating system as included in the above second-type device is the same as the BIOS used by the host operating system as included in the first-type device. Thus, in a practical design, the BIOS on the main board can be set to be shared in the VMM, such that the BIOS can be directly accessed by both the host and guest operating systems. The BIOS provides hardware information support to the host operating system or the guest operating system for accessing a particular hardware device.

In order to enable an operating system, such as the Guest OS, to access a particular hardware device directly, it is required to configure the hardware device for the Guest OS.

Figure 4:
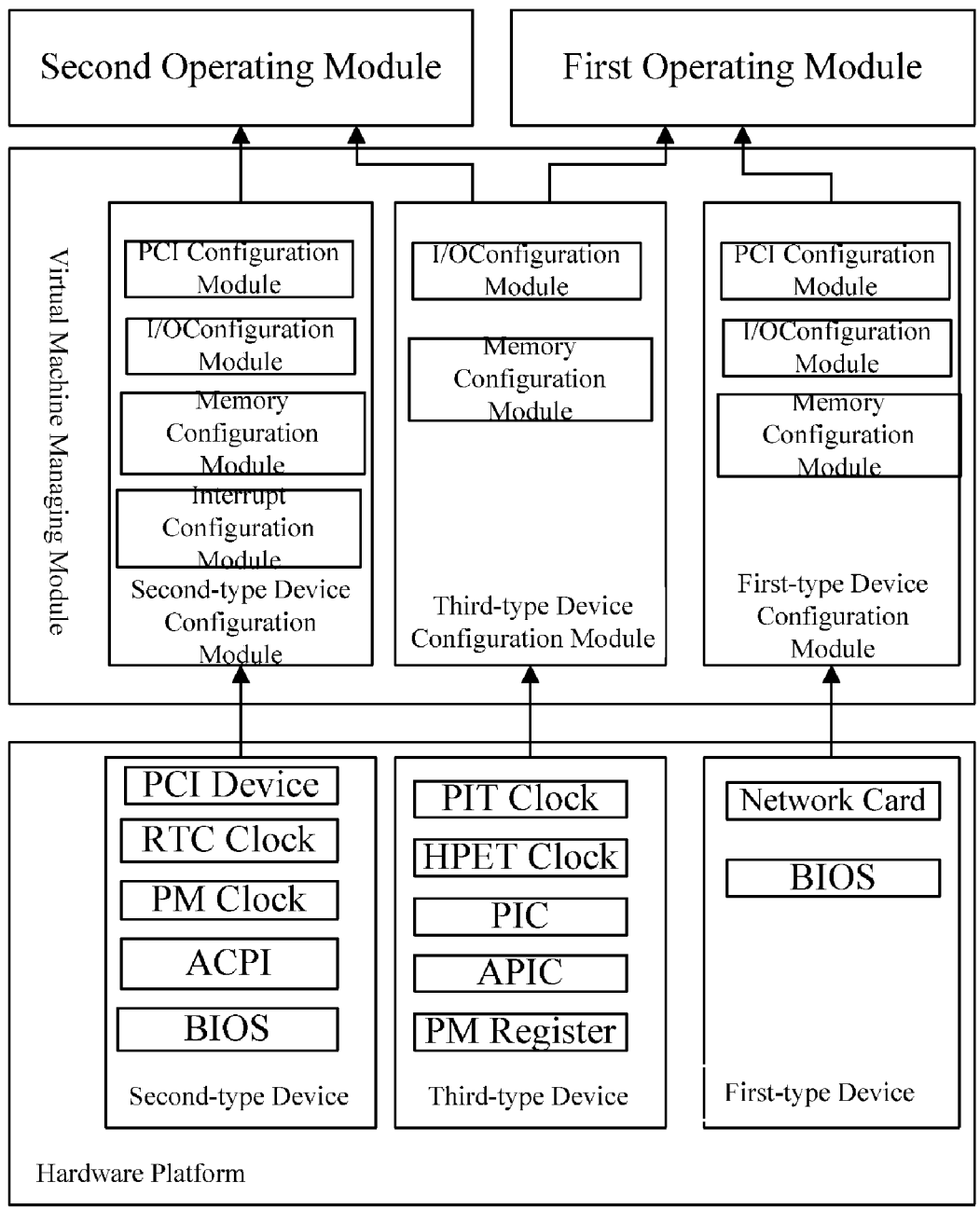
FIG. 4 is a schematic diagram showing the detailed architecture of the computer in FIG. 3.

Thus, as shown in FIG. 4, on the basis of the above embodiment, the second-type device configuration module as described above comprises a PCI configuration module for configuring a PCI configuration space for the PCI device included in the above second-type device, the PCI configuration space comprising at least a header area for identifying the PCI device and a device specific area for storing information on the PCI device.

The PCI bus configuration space is an address space having a capacity of 256 bytes and a specified record structure. The space can be divided into two parts, a header area and a device specific area. In each field, registers required by the PCI device and related to the PCI device are set. The configuration space for a device can be accessed at the time of system bootstrap or at other timings.

The header area has a length of 64 bytes, with the offset address ranging from 00H to 3FH. Individual fields included in this field can be used to identify different individual devices, respectively, such that the devices can be controlled in a common way. Each device has to be set according to the format and specification for this area. However, the remaining 192 bytes in the configuration space may vary from one device to another.

During the startup of the system, the system software may be required to scan the PCI bus to determine devices actually connected to the bus. In this regard, the configuration software can read the device vendor identification number on each PCI slot. If there is no device in the read location, it should be correctly reported by the main bridge. OFFFH is an invalid device vendor identification number. Thus, if there is no device, the main bridge can return OFFFH as the readout value for the device configuration space register.

The class code register in the header area is a read-only register for identifying the overall function of the device and a particular register-level programming interface. This register can be divided into three segments, each occupying one byte. The highest byte at 0BH is a basic class code for roughly classifying the function of device (e.g., 02H representing a network controller and 03H representing a display controller). The middle byte at 0AH is used to provide more accurate, more detailed classification for the function of the device. The lowest byte at 09H is used to identify a particular register-level programming interface (if any), such that software irrelevant to the device can interact with the device.

The second-type device configuration module as described above also comprises a I/O configuration module for configuring I/O port for the above PCI device and the advanced configuration and power interface (APCI). The PCI device can access the PCI bus configuration space by using 0XCF8 and 0XCFC, and read information related to the PCI device from the configuration space, such that the operation system can access the PCI device.

The second-type device configuration module as described above further comprises:

a memory configuration module for configuring memory resource for the above PCI device and the advanced configuration and power interface (ACPI), such that the operation system can access the PCI device directly; and an interrupt configuration module for establishing, for the PCI device, mapping between the interrupt numbers for the interrupt controller mode (PIC) and the advanced programmable interrupt controller mode (APIC), such that the operation system can access the PCI device directly.

The operating system typically operates in a PIC interrupt mode where only 16 interrupt numbers are available. After start-up, the operating system will change into an APIC operation mode. However, the number of interrupts for a PCI device is typically larger than 16. There are two types of interrupt mapping since actual hardware operates in the APIC mode:

1. The guest operating system operates in the APIC mode where the interrupt numbers for actual hardware devices used before and after the guest operating system starts are the same. In this case, there is a one-to-one correspondence between the interrupt numbers in the PIC interrupt control mode and those in the APIC interrupt control mode.

2. The guest operating system operates in the PIC mode where the mapping of these two types of interrupt modes has to be identified using a south bridge register.

For the above second-type device, when it is directly used by the guest operating system, corresponding modification to the software in the BIOS is required in addition to the above hardware-related configuration, such that the guest operating system can use the BIOS, rather than a virtualized BIOS.

Thus, the BIOS used by the guest operating system comprises a first processing module for modifying the memory address and memory size of the advanced configuration and power interface (ACPI) in a memory distribution table to generate a new memory distribution table and providing actual memory resource to the guest operating system based on the new memory distribution table. The memory distribution table corresponds to the E820 of the interrupt INT 15. After this modification, the guest operating system can use actual memory directly.

The BIOS used by the guest operating system also comprises a second processing module for modifying a symmetrical multiprocessing system (SMP) table to generate a new SMP table and providing a virtualized advanced programmable interrupt controller (APIC) to the guest operating system based on the new SMP table. In particular, the SMP table is modified based on the APIC type of the ID of the virtualized APIC.

The BIOS used by the guest operating system further comprises a third processing module for modifying a MADT table corresponding to a virtualized advanced configuration and power interface (ACPI) to generate a new MADT table and providing the actual advanced configuration and power interface (ACPI) to the guest operating system based on the new MADT table. In particular, the new MADT table is regenerated from the old MADT table based on the ACPI specification and an APIC virtualized by XEN.

In addition, it is also required to initialize the virtual platform in the BIOS, mainly including the initialization of the interrupt control PIC and of the system clock, so as to ensure that the hardware devices can be normally used by the virtual operating system.

The above third-type device configuration module comprises:

an I/O configuration module for configuring I/O port for the virtualized second-type clock and the virtualized interrupt controller; and a memory configuration module for configuring virtual memory for the virtualized second-type clock and the virtualized interrupt controller.

The virtualized interrupt controller comprises a virtualized interrupt controller for I/O port and/or a virtualized interrupt controller for CPU.

Additionally, to enable the host operating system to access the PCI device included in the first-type device, the first-type device configuration module comprises:

a PCI configuration module for configuring a PCI configuration space for the PCI device, the PCI configuration space comprising at least a header area for identifying the PCI device and a device specific area for storing information on the PCI device, the PCI device being for example a network card which can be used by the host operating system directly;

an I/O configuration module for configuring I/O port for the PCI device, e.g., the I/O port of the network card being enabled for the host operating system only while remaining disabled for the guest operating system; and a memory configuration module for configuring memory resource for the PCI device.

In all of the above embodiments, the first operating system and the second operating system are described for convenience, rather than limiting the first operating system to be Domain 0 and the second operating system to be Guest OS. Of course, the second operating system can be Domain 0 and the first operating system can be Guest OS. Moreover, the virtualized Guest OS may comprise a plurality of virtualized Guest OSs.

In summary, the embodiments of the present invention enable a main virtual system (such as a Guest OS) to operate on a hardware platform that is almost the same as an actual one. The access control of the hardware devices can be placed into a virtual machine manager, so as to consider the distribution and use of the devices as a whole. As such, the devices in the hardware platform can be directly provided, in a DHA mode, only to a particular operating system in combination with the use of BIOS in the main board, thereby reducing problems in developing. By modifying the related information in the BIOS of the computer, the BIOS can be an actual BIOS for the virtual operating system. In this way, when the virtual operating system directly accesses the hardware device, the incompatibility between hardware and software of the virtual system in the computer can be avoided.

Figure 5:
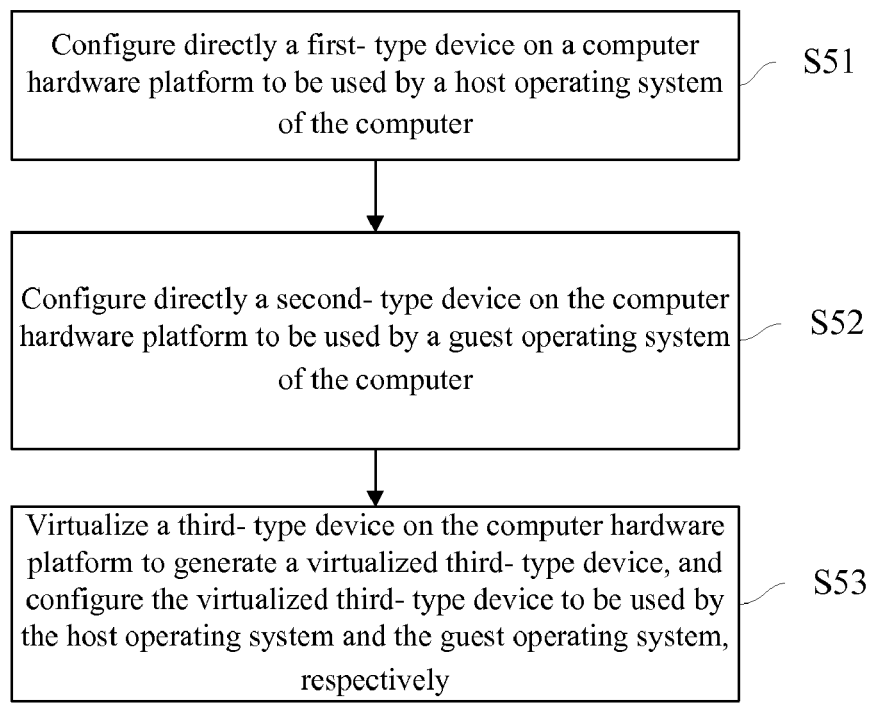
FIG. 5 is a schematic flow-chart showing an method for directly accessing computer hardware by a virtual system according to an embodiment of the present invention.

As shown in FIG. 5, an embodiment of the present invention also provides a method for directly accessing computer hardware by a virtual system, which comprises the following steps of:

at step S51, configuring directly a first-type device on a computer hardware platform to be used by a host operating system of the computer, the first-type device being a device dedicated to be used by the main operating system;

at step S52, configuring directly a second-type device on the computer hardware platform to be used by a guest operating system of the computer, the second-type device being a device dedicated to be used by the guest operating system; and at step S53, virtualizing a third-type device on the computer hardware platform to generate a virtualized third-type device, and configuring the virtualized third-type device to be used by the host operating system and the guest operating system, respectively.

Herein, the first-type device comprises a PCI device and a BIOS used by the host operating system. The PCI device can be a network card or another PCI device, such as a sound card and a flash device.

The second-type device comprises a PCI device, a first-type clock, an advanced configuration and power interface (ACPI) and a BIOS used by the guest operating system. The first-type clock comprises a real-time clock (RTC clock) and an advanced configuration and power interface timer clock (PM clock). The PCI device may comprise any PCI device other than a network card.

The third-type device comprises a second-type clock, an interrupt controller and a port mode register. The second-type clock comprises a programmable interval timer clock (PIT clock) and a high precision event timer (HPET clock). The interrupt controller comprises an interrupt controller (PIC) and an advanced programmable interrupt controller (APIC).

The BIOS used by the guest operating system as included in the second-type device is the same as the BIOS used by the host operating system as included in the first-type device. Thus, in practical design, the BIOS on the main board can be set to be shared in the VMM, such that the actual BIOS can be accessed by both the host and guest operating systems.

At step S52, the step of configuring directly the second-type device on the computer hardware platform to be used by the guest operating system of the computer comprises:

configuring a PCI configuration space for a PCI device included in the second-type device, the PCI configuration space comprising at least a header area for identifying the PCI device and a device specific area for storing information on the PCI device;

configuring I/O port for the PCI device and a advanced configuration and power interface (ACPI) included in the second-type device;

configuring memory resource for the PCI device and the advanced configuration and power interface (ACPI) included in the second-type device; and establishing, for the PCI device included in the second-type device, mapping between the interrupt numbers for an interrupt controller mode (PIC) and an advanced programmable interrupt controller mode (APIC).

The mapping may or may not be a one-to-one mapping. For example:

1. The Guest OS operates in the APIC mode where the interrupt numbers for actual hardware devices used before and after the Guest OS starts are the same. In this case, there is a one-to-one correspondence between the interrupt numbers in the PIC interrupt control mode and those in the APIC interrupt control mode.

2. The Guest OS operates in the PIC mode where the mapping of these two types of interrupt modes has to be identified using a south bridge register. In this case, the mapping is not a one-to-one mapping. When the Guest OS starts, there are 16 interrupt numbers for actual hardware. However, after the Guest OS starts, there are 256 interrupt numbers in the virtual APIC mode. The mapping between the 16 interrupt numbers and the 256 interrupt numbers can be obtained using the above south bridge register.

In order to enable the Guest OS to access the actual hardware, when configuring the above second-type device, it is required to obtain support from software, i.e., to modify the hardware-related information in the BIOS, which mainly comprises:

modifying the memory address and memory size of the advanced configuration and power interface (ACPI) in a memory distribution table in a BIOS of the computer to generate a new memory distribution table, and providing actual memory resource to the Guest OS based on the new memory distribution table;

modifying a symmetrical multiprocessing system (SMP) table in the BIOS of the computer to generate a new SMP table, and providing a virtualized advanced programmable interrupt controller (APIC) to the Guest OS based on the new SMP table; and modifying a MADT table in the BIOS of the computer corresponding to a virtualized advanced configuration and power interface (ACPI) to generate a new MADT table, and providing the actual advanced configuration and power interface (ACPI) to the Guest OS based on the new MADT table.

In addition to the above second-type device which can be directly used by the Guest OS, there is a third-type device which needs to be virtualized to be used by both of the Guest OS and Domain 0.

Thus, at step 53, the step of configuring the virtualized third-type device to be used by the main operating system and the guest operating system, respectively, comprises:

configuring I/O port for a virtualized second-type clock and the virtualized interrupt controller (APIC) included in the virtualized third-type device; and configuring virtual memory for the virtualized second-type clock and the virtualized interrupt controller (APIC) included in the virtualized third-type device.

For Domain 0 system, it should be possible for Domain 0 to use the PCI device and BIOS on the hardware platform directly.

Thus, the step of configuring directly the first-type device on the computer hardware platform to be used by the host operating system comprises:

configuring a PCI configuration space for a PCI device included in the first-type device, the PCI configuration space comprising at least a header area for identifying the PCI device and a device specific area for storing information on the PCI device;

configuring I/O port for the PCI device included in the first-type device; and configuring memory resource for the PCI device included in the first-type device.

The embodiments of the present invention enable a main virtual system (Guest OS) to operate on a hardware platform that is almost the same as an actual one. The access control of the hardware devices can be placed into a virtual machine manager, i.e., the access control of the first-, second- and third-type devices can be totally placed into a virtual machine manager, so as to consider the distribution and use of the devices as a whole. As such, the devices on the hardware platform can be directly provided, in a DHA mode, only to a particular operating system, thereby reducing problems in developing a hardware device which is provided in a DHA mode to a particular operating system. By modifying the related information in the BIOS of the computer, the BIOS can be an actual BIOS for the virtual operating system. In this way, when the virtual operating system directly accesses the hardware device in combination with the use of BIOS in the main board, the incompatibility between hardware and software of the virtual system in the computer can be avoided.

Although the present invention has been disclosed above with the preferred embodiments, those skilled in the art can make improvements and variations to the present invention without departing from the scope of the present invention. Therefore, these improvements and variations are encompassed by the scope of the present invention.

What is claimed is:

1. A computer in which computer hardware can be accessed directly by a virtual system, comprising:
    a hardware platform having a first-type device, a second-type device and a third-type device provided thereon;
    a virtual machine managing module installed with a virtual machine manager;
    a first operating module installed with a host operating system; and
    a second operating module installed with a guest operating system, the guest operating system being installed on the virtual machine manager;
    wherein the virtual machine managing module comprises:
        a first-type device configuration module for directly configuring the first-type device to be used by the host operating system, the first-type device being a device dedicated to be used by the host operating system;
        a second-type device configuration module for directly configuring the second-type device to be used by the guest operating system, the second-type device being a device dedicated to be used by the guest operating system; and
        a third-type device configuration module for virtualizing the third-type device to generate a virtualized third-type device and configuring the virtualized third-type device to be used by the host operating system and the guest operating system, respectively;
        wherein the first-type device comprises a PCI device, and a BIOS used by the host operating system;
        the second-type device comprises a PCI device, a first-type clock, an advanced configuration and power interface, and a BIOS used by the guest operating system; and
        the third-type device comprises a second-type clock, an interrupt controller, and a port mode register.

2. The computer according to claim 1, wherein
    the first-type clock comprises a real-time clock, and an advanced configuration and power interface timer clock;
    the second-type clock comprises a programmable interval timer clock, and a high-precision event timer;
    the interrupt controller comprises an interrupt controller, and an advanced programmable interrupt controller; and
    the PCI device comprises a network card.

3. The computer according to claim 1, wherein the second-type device configuration module comprises:
    a PCI configuration module for configuring a PCI configuration space for the PCI device, the PCI configuration space comprising at least a header area for identifying the PCI device and a device specific area for storing information on the PCI device;
    an I/O configuration module for configuring I/O port for the PCI device and the advanced configuration and power interface;
    a memory configuration module for configuring memory resource for the PCI device and the advanced configuration and power interface; and
    an interrupt configuration module for establishing, for the PCI device, mapping between the interrupt numbers for the interrupt controller mode and the advanced programmable interrupt controller mode.

4. The computer according to claim 3, wherein the BIOS used by the guest operating system comprises:
    a first processing module for modifying the memory address and memory size of the advanced configuration and power interface in a memory distribution table to generate a new memory distribution table, and providing actual memory resource to the guest operating system based on the new memory distribution table;
    a second processing module for modifying a symmetrical multiprocessing system table to generate a new symmetrical multiprocessing system table, and providing a virtualized advanced programmable interrupt controller to the guest operating system based on the new symmetrical multiprocessing system table; and
    a third processing module for modifying a MADT table corresponding to a virtualized advanced configuration and power interface to generate a new MADT table, and providing the actual advanced configuration and power interface to the guest operating system based on the new MADT table.

5. The computer according to claim 1, wherein the third-type device configuration module comprises:
    an I/O configuration module for configuring I/O port for the virtualized second type clock and the virtualized interrupt controller; and
    a memory configuration module for configuring virtual memory for the virtualized second-type clock and the virtualized interrupt controller.

6. The computer according to claim 5, wherein the virtualized interrupt controller comprises a virtualized interrupt controller for I/O port and/or a virtualized interrupt controller for CPU.

7. The computer according to claim 1, wherein the first-type device configuration module comprises:
    a PCI configuration module for configuring a PCI configuration space for the PCI device, the PCI configuration space comprising at least a header area for identifying the PCI device and a device specific area for storing information on the PCI device;
    an I/O configuration module for configuring I/O port for the PCI device; and
    a memory configuration module for configuring memory resource for the PCI device.

8. A method for directly accessing computer hardware by a virtual system in a computer, the computer comprising:

a hardware platform having a first-type device, a second-type device and a third-type device provided thereon;

a virtual machine managing module installed with a virtual machine manager, and comprising a first-type device configuration module, a second-type device configuration module and a third-type device configuration module;

a first operating module installed with a host operating system; and a second operating module installed with a guest operating system, the guest operating system being installed on the virtual machine manager;

the method comprising steps of:

configuring, by the first-type device configuration module, directly the first-type device on the hardware platform to be used by the host operating system of the computer;

configuring, by the second-type device configuration module, directly the second-type device on the hardware platform to be used by the guest operating system of the computer; and virtualizing, by the third-type device configuration module, the third-type device on the hardware platform to generate a virtualized third-type device, and configuring the virtualized third-type device to be used by the host operating system and the guest operating system, respectively;

wherein the step of configuring directly the second-type device on the hardware platform to be used by the guest operating system of the computer comprises:

configuring a PCI configuration space for a PCI device included in the second-type device, the PCI configuration space comprising at least a header area for identifying the PCI device and a device specific area for storing information on the PCI device;

configuring I/O port for the PCI device and a advanced configuration and power interface included in the second-type device;

configuring memory resource for the PCI device and the advanced configuration and power interface included in the second-type device; and establishing, for the PCI device included in the second-type device, mapping between the interrupt numbers for an interrupt controller mode and an advanced programmable interrupt controller mode.

9. The method according to claim 8, further comprising:

modifying the memory address and memory size of the advanced configuration and power interface in a memory distribution table in a BIOS of the computer to generate a new memory distribution table, and providing actual memory resource to the guest operating system based on the new memory distribution table;

modifying a symmetrical multiprocessing system table in the BIOS of the computer to generate a new symmetrical multiprocessing system table, and providing a virtualized advanced programmable interrupt controller to the guest operating system based on the new symmetrical multiprocessing system table; and modifying a MADT table in the BIOS of the computer corresponding to a virtualized advanced configuration and power interface to generate a new MADT table, and providing actual advanced configuration and power interface to the guest operating system based on the new MADT table.

10. The method according to claim 8, wherein the step of configuring the virtualized third-type device to be used by the host operating system and the guest operating system, respectively, comprises:

configuring I/O port for a virtualized second-type clock and a virtualized interrupt controller included in the virtualized third type device; and configuring virtual memory for the virtualized second-type clock and the virtualized interrupt controller included in the virtualized third-type device.

11. A method for directly accessing computer hardware by a virtual system in a computer, the computer comprising:

a hardware platform having first-type device, a second-type device and a third-type device provided thereon;

a virtual machine managing module installed with a virtual machine manager, and comprising a first-type device configuration module, a second-type device configuration module and a third-type device configuration module;

a first operating module installed with a host operating system; and a second operating module installed with a guest operating system, the guest operating system being installed on the virtual machine manager;

the method comprising steps of:

configuring, by the first-type device configuration module, directly the first-type device on the hardware platform to be used by the host operating system of the computer;

configuring, by the second-type device configuration module, directly the second-type device on the hardware platform to be used by the guest operating system of the computer; and virtualizing, by the third-type device configuration module, the third-type device on the hardware platform to generate a virtualized third-type device, and configuring the virtualized third-type device to be used by the host operating system and the guest operating system, respectively, wherein the step of configuring directly the first-type device in the hardware platform to be used by the host operating system comprises:

configuring a PCI configuration space for a PCI device included in the first-type device, the PCI configuration space comprising at least a header area for identifying the PCI device and a device specific area for storing information on the PCI device;

configuring I/O port for the PCI device included in the first-type device; and configuring memory resource for the PCI device included in the first-type device.

* * * * *